(12) United States Patent
Dewald

(10) Patent No.: US 7,052,150 B2
(45) Date of Patent: May 30, 2006

(54) ROD INTEGRATOR

(75) Inventor: Duane Scott Dewald, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 669 days.

(21) Appl. No.: 09/750,640

(22) Filed: Dec. 28, 2000

(65) Prior Publication Data

US 2001/0008470 A1 Jul. 19, 2001

Related U.S. Application Data

(60) Provisional application No. 60/173,942, filed on Dec. 30, 1999.

(51) Int. Cl.
*G02B 5/08* (2006.01)
*G02B 7/182* (2006.01)

(52) U.S. Cl. .................................. 359/856; 362/551
(58) Field of Classification Search ................ 359/434, 359/856; 385/31, 38; 362/551, 560; 349/61, 349/65
See application file for complete search history.

(56) References Cited

U.S. PATENT DOCUMENTS

| | | | |
|---|---|---|---|
| 2,933,554 A | 4/1960 | Fredendall | |
| 3,256,385 A | 6/1966 | Miller | |
| 3,748,035 A | 7/1973 | Mannik | |
| 3,913,872 A | 10/1975 | Weber | |
| 4,415,931 A | 11/1983 | Dischert | |
| 4,739,396 A | 4/1988 | Hyatt | |
| 4,744,615 A | 5/1988 | Fan et al. | |
| 4,805,984 A | 2/1989 | Cobb, Jr. | |
| 5,335,158 A * | 8/1994 | Kaplan et al. | ............... 362/303 |
| 5,410,370 A | 4/1995 | Janssen | |
| 5,416,514 A | 5/1995 | Janssen et al. | |
| 5,508,738 A | 4/1996 | Janssen et al. | |
| 5,528,318 A | 6/1996 | Janssen | |
| 5,532,763 A | 7/1996 | Janssen et al. | |
| 5,548,347 A | 8/1996 | Melnik et al. | |
| 5,608,467 A | 3/1997 | Janssen et al. | |
| 5,684,504 A | 11/1997 | Verhulst et al. | |
| 5,696,865 A | 12/1997 | Beeson et al. | |
| 5,781,251 A | 7/1998 | Otto | |
| 5,822,130 A * | 10/1998 | Nagano et al. | ............. 359/668 |
| 5,829,858 A | 11/1998 | Levis et al. | |
| 5,845,981 A | 12/1998 | Bradley | |
| 5,902,033 A | 5/1999 | Levis et al. | |
| 6,007,225 A * | 12/1999 | Ramer et al. | ............... 362/304 |
| 6,097,456 A | 8/2000 | Wang | |
| 6,139,156 A * | 10/2000 | Okamori et al. | ............. 353/102 |
| 6,155,687 A * | 12/2000 | Peterson | ....................... 353/84 |
| 6,205,271 B1 * | 3/2001 | Bowron et al. | ................ 385/31 |
| 6,231,193 B1 * | 5/2001 | Sugawara | .................... 353/102 |
| 6,260,974 B1 * | 7/2001 | Koyama | ....................... 353/98 |
| 6,266,105 B1 | 7/2001 | Gleckman | |
| 6,361,172 B1 | 3/2002 | Brennesholtz | |

* cited by examiner

*Primary Examiner*—M. Robinson
(74) *Attorney, Agent, or Firm*—Charles A. Brill; Wade James Brady, III; Frederick J. Telecky, Jr.

(57) ABSTRACT

An integrating rod (200) for use with a multiple segment dynamic filter, such as a spiral dichroic color wheel having three or more narrow filters adjacent to the exit face (206) to enable the integrating rod to recapture light rejected by a given segment of the dynamic filter. The rejected light travels back through the integrating rod where a majority of the light strikes the mirrored entrance face (202). Light reflected by the mirrored entrance face, or light exiting through the entrance aperture (204) and returning to the integrating rod after being reflected by the lamp reflector, once again travels to the exit face (206) of the integrating rod (200). After exiting through the exit face (206) of the integrating rod (200) a second time, the recycled light has a good chance of striking a different filter segment of the dynamic filter and being used by the display system.

30 Claims, 3 Drawing Sheets

ROD INTEGRATOR

CROSS-REFERENCE TO RELATED APPLICATIONS

This application claims priority under 35 USC§119(e)(1) of provisional application No. 60/173,942 filed Dec. 30, 1999.

| Patent No. | Filing Date | Issue Date | Title |
|---|---|---|---|
| TI-29879 | | | Sequential Color Recapture for Projection Systems |
| TI-29914 | | | Color Wheel For A Falling Raster Scan |

FIELD OF THE INVENTION

This invention relates to the field of display systems, particularly to display systems using a rod integrator to homogenize a beam of light prior to modulating the beam of light using a light valve, more particularly to sequential color recapture display systems using an integrating rod to implement the light recapturing feature.

BACKGROUND OF THE INVENTION

Viewers evaluate display systems based on many criteria such as image size, resolution, contrast ratio, color purity, and brightness. Image brightness is a particularly important metric in many display markets since the available brightness can limit the image size of a projected image and controls how well the image can be seen in venues having high levels of ambient light.

Projection display designers increase the brightness of a given projection display by increasing the light source used to form the image. Increasing the light source, however, also increases the cost, size, and weight of the display system. Additionally, larger light sources generate additional heat that must be dissipated by the display.

Many other factors affect the brightness of the images produced by the display system. One of the major factors is the number of modulators used to modulate the light used to produce the image. Display systems that use a modulator with a very fast response time, such as the digital micromirror device (DMD™), can use a single modulator to create a full color image. Other display systems use three modulators, such as liquid crystal display (LCD) panels or DMDs, to create a full color image.

Micromirror-based display systems typically operate the micromirrors in a digital, or bistable, manner. Digital operation fully deflects a given micromirror to either a first position or a second position. The illumination optics of the display device illuminate the entire array of micromirror cells. Micromirrors deflected to the first position reflect light along a first path, whereas micromirrors deflected to a second position reflect light along a second path. The projection optics of the display system collects the light from the mirrors in the first position and focus the light onto an image plane. The light reflected by mirrors in the second position is prevented from reaching the image plane. An image pixel associated with a mirror in the first position is brightly illuminated, whereas an image pixel associated with mirrors in the second position are not illuminated.

Pulse width modulation creates the perception of gray scale intensities with a digital micromirror device or other spatial light modulator. When using pulse width modulation, a given micromirror element is rapidly turned on and off in response to a digital intensity word. The duty cycle of the mirror determines the total amount of light contributed to an image pixel. If the pixel is pulsed quickly enough, the human eye will accurately measure the average intensity of the pixel, but will fail to detect the pulsing.

Full-color images also are produced by taking advantage of the relatively slow response time of the human eye. Each frame period is divided into at least three periods. During each period, a primary color image is produced. If the primary color images are produced in rapid succession, the eye will perceive a single full-color-image.

An alternative to the sequential color display system is a three-modulator display system. The three-modulator display system is very similar to the sequential color display system in that they both form full color images by the combining three primary color images. The disadvantage of the three-modulator display system is the cost of the three modulators and the complex optics required both to split the white light beam from the light source into three primary color light beams and to recombine the modulated primary color light beams.

The disadvantage of the single-modulator sequential color display systems is its low image brightness. Because the white light source is time-divided into three primary color light beams, most of the light at any given time is not used. For example, when the blue primary color image is being formed, the green and red output of the white light source are filtered out of the light beam. Thus, a sequential color display system, while generally less expensive than the three-modulator display system, makes very inefficient use of the light produced by the light source.

The lost light not only reduces the brightness of the image produced by the display system, discarding the light creates several problems for the display system. The light filtered out of the light beam generally becomes stray light that the display system must control to prevent from reaching the image plane and degrading the contrast of the displayed image. The off-primary light is generally converted to heat. The heat must be dissipated by using larger fans, which in turn increase the noise produced by the display system and increase the size of the display system.

What is needed is an efficient illumination system that is capable of providing the efficiency of a three-modulator display system while taking advantage of the simplified optics and low cost of a one-modulator display system.

SUMMARY OF THE INVENTION

Objects and advantages will be obvious, and will in part appear hereinafter and will be accomplished by the present invention that provides an integrating rod for light recycling and method thereof. One embodiment of the claimed invention provides an integrating rod. The integrating rod is comprised of an elongated body to reflect light traveling through the integrating rod, an entrance face on a first end of the elongated body, and a mirrored entrance aperture at the entrance face. The mirrored entrance aperture has a transmissive entrance aperture portion and a mirrored portion. The mirrored entrance aperture allows light to pass through the aperture and enter the elongated body of the integrating rod. The mirrored entrance aperture reflects the light traveling through the elongated body to the entrance face that strikes the mirrored entrance aperture outside the transmissive entrance aperture. The mirrored entrance aperture is either deposited on the body of the integrating rod, or formed as a separate piece and placed at the end of the rod.

According to another embodiment of the disclosed invention, a polarizing integrating rod is provided. The polarizing integrating rod is comprised of an elongated body to reflect light traveling through the integrating rod, an entrance face on a first end of the elongated body, a mirrored entrance aperture at the entrance face, a polarizing coating, and a quarter wave plate. The mirrored entrance aperture has a transmissive entrance aperture portion and a mirrored portion. The mirrored entrance aperture allows light to pass through the aperture and enter the elongated body of the integrating rod. The mirrored entrance aperture reflects the light traveling through the elongated body to the entrance face that strikes the mirrored entrance aperture outside the transmissive entrance aperture. The polarizing coating transmits light of a first polarization and reflects light of a second polarization. The reflected light of a second polarization passes through the quarter wave plate twice converting it to light of the first polarization which then passes through the polarizing coating. The mirrored entrance aperture is either deposited on the body of the integrating rod, or formed as a separate piece and placed at the end of the rod. Alternatively, the mirrored entrance aperture is deposited on the quarter wave plate which is placed at the end of the rod.

The disclosed integrating rod not only homogenizes a beam of light passing through the integrating rod, it also recycles light rejected by a dynamic filter at the exit face of the integrating rod or a polarization coating. By recycling the rejected light, the brightness of the display system using the integrating rod is increased without using a brighter light source.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new method and system of illuminating a light valve has been developed. The new method provides a white light beam to three or more unique portions of a dynamic color filter, typically a color wheel. Each portion of the dynamic filter allows a band of wavelengths to pass through the dynamic filter and rejects all wavelengths outside that band of wavelengths. The rejected wavelengths reenter the illumination system and are later represented to the dynamic filter. Upon the second and subsequent application of the rejected light to the dynamic filter, portions of the rejected light are accepted by the filter and used to illuminate a light valve. The light valve modulates the selected wavelengths to produce a modulated beam of light that is focused onto an image plane. Recycling the rejected wavelengths greatly increases the potential brightness of a display system without the use of a brighter light source or additional light valves and color splitters.

The novel integrating rod disclosed herein is an important component of the sequential color recycling system. The novel integrating rod not only assists the recycling function of the display, but also provides an efficient means for matching a particular lamp to a light valve. Furthermore, one embodiment of the disclosed integrating rod provides an efficient mechanism for recycling off state polarization light in polarization dependent displays.

Figure 1:
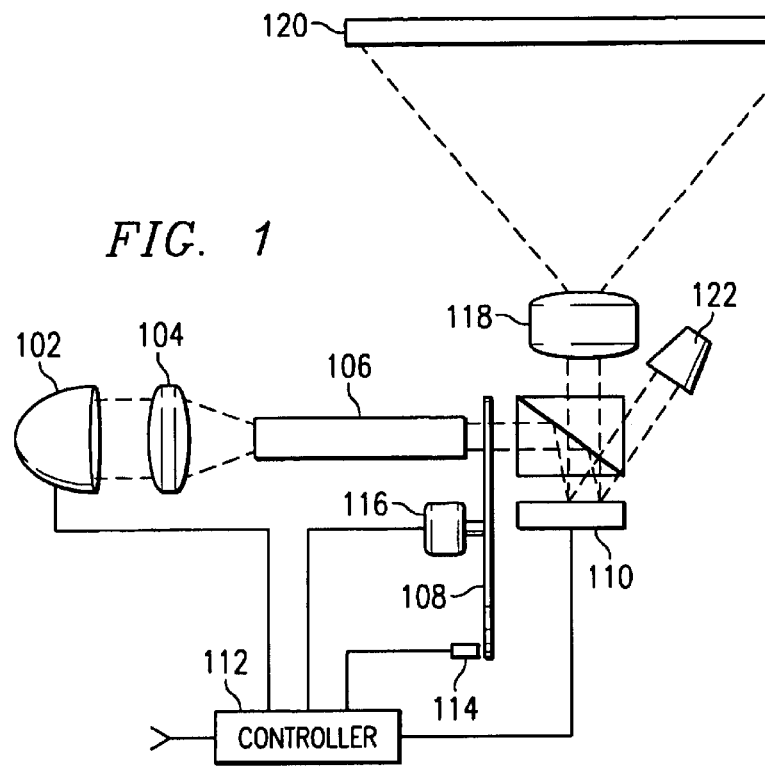
FIG. 1 is a schematic view of a scrolling color display system according to one embodiment of the present invention.

FIG. 1 is a schematic illustration of a typical display system according to the present invention. In FIG. 1, light from light source 102 is focused by a collection optic 104 onto the entrance end of an integrating light rod 106. The light travels through the rod 106, which either can be hollow with mirrored internal surfaces, or a solid transparent component. As the light travels through the rod 106, it is reflected by the sides of the rod 106 becoming homogenous across the light beam by the time the light beam exits the exit end of the integrating rod 106. If the integrating rod 106 is hollow, the mirrored internal surfaces of the rod 106 reflect the light traveling through the rod. If the rod is solid, the light undergoes total internal reflection at the interface between the light rod 106 and the air surrounding the light rod 106.

Light exiting the integrating rod 106 is filtered by the novel spiral color wheel 108 described herein. As described below, the light passing through the color wheel 108 is imaged onto a light valve 110, shown in FIG. 1 as a micromirror device. The light rejected by the dichroic filters of the color wheel 108 is reflected back into the integrating rod 106 where it can be recaptured and recycled. As described in TI-29879, careful arrangement of the illumination optics—light source 102, collection optic 104, integrating rod 106, and color wheel 108—enables the display system to reuse the light rejected by the dichroic filters of the color wheel, dramatically increasing the brightness of the display system.

The light valve 110 modulates the light incident the light valve in response to image data signals received from a display system controller 112. The controller synchronizes the image data signals provided to the light valve with the rotation of the color wheel 108 as detected by an index mark detector 114 or some other sensing means such as measurement such as signals from the color wheel motor 116.

When a micromirror is used as the light valve 110, portions of the light reaching each micromirror element are either reflected through a projection optic 118 to an image plane 120 to form a bright pixel on the image plane, or the light is reflected away from the image plane to a light dump 122.

Figure 2:
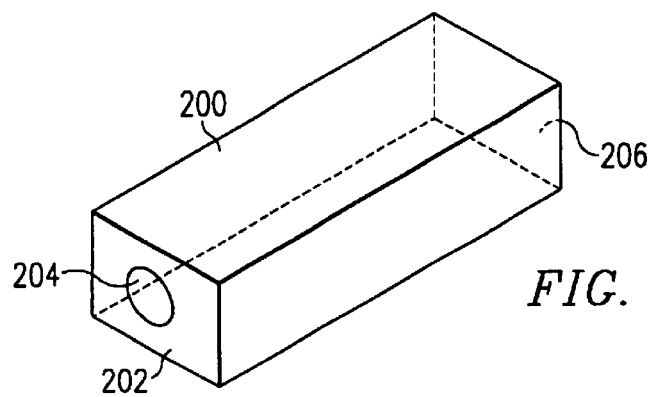
FIG. 2 is a perspective view of an integrating rod especially adapted to implement the sequential color recapture function used by the display system of FIG. 1.

FIG. 2 is a perspective view of one embodiment of an integrating rod 200 designed to be used in a sequential color recycling display system. As described above, the integrating rod can be either a mirrored hollow structure, or a transparent solid. If the integrating rod is a transparent solid structure, either total internal reflection or mirrored surfaces are relied upon to reflect light traveling through the integrating rod.

The integrating rod of FIG. 2 has a mirrored entrance face 202 with a small aperture 204 opened through the mirrored surface. The aperture typically is either a round or oval opening sized to efficiently couple the integrating rod to a light source—arc lamps with long arcs generally require larger apertures than lamps with small arcs. Light entering the aperture is reflected down the length of the integrating rod and exits the exit face 206 of the integrating rod.

As described in TI-29879, entitled Sequential Color Recapture for Display Systems, the integrating rod 200 coupled with a multiple segment dynamic filter, such as a spiral dichroic color wheel having three or more narrow filters adjacent to the exit face 206 enables the integrating rod to recapture light rejected by a given filter of the dynamic filter. The rejected light travels back through the integrating rod where a majority of the light strikes the mirrored entrance face 202. Light reflected by the mirrored entrance face, or light exiting through the entrance aperture 204 and returning to the integrating rod after being reflected by the lamp reflector, once again travels to the exit face 206 of the integrating rod 200. After exiting through the exit face 206 of the integrating rod 200 a second time, the recycled light has a good chance of striking a different filter segment of the dynamic filter and being used by the display system.

Figure 3:
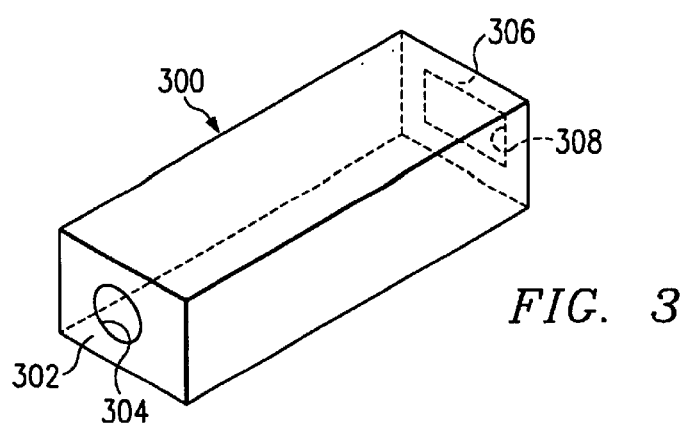
FIG. 3 is a perspective view of a second embodiment of an integrating rod especially adapted to implement the sequential color recapture function and having a mirrored exit aperture.
Figure 7:
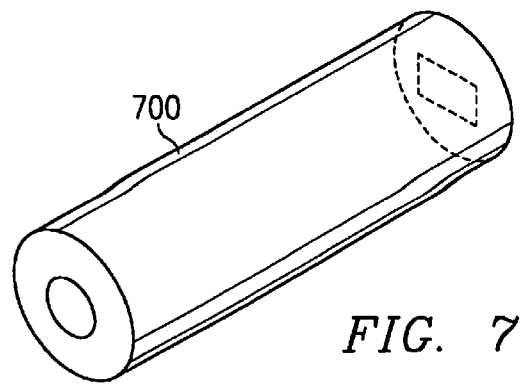
FIG. 7 is a perspective view of a cylindrical integrating rod similar to the rectangular rod of FIG. 3.

FIG. 3 is another embodiment of the disclosed invention. In FIG. 3 an integrating rod 300 has both a mirrored input face 302 with an aperture 304 and a mirrored exit face 306 with an exit aperture 308. The cross-sectional area of integrating rod 300 is larger than necessary to match the etendue of the light valve used with the integrating rod. The size and shape of the input aperture is chosen to maximize light collection from the light source. Preferably, the etendue of the input aperture is the same as the etendue of the light valve being used. The exit aperture 308 is deposited to provide an exit aperture that is appropriately sized for the light valve being used. The aspect ratio of the exit aperture 308 is the same as the light valve used with the integrating rod (e.g. 4:3 for NTSC or 16:9 for HDTV). Preferably the area of the input aperture 304 and the area of the output aperture 308 is the same. The ratio of the exit aperture 308 to the cross-sectional area of the integrating rod 300 determines the probability of light traveling through the rod exiting the rod. The ratio of the entrance aperture 304 to the cross-sectional area of the integrating rod 300 determines the probability of light traveling back towards the entrance face of the integrating rod being recycled by the integrating rod 300 and returned to the exit face of the integrating rod 300. FIG. 7 is a perspective view of a cylindrical integrator rod 700 having a circular entrance aperture and a rectangular exit aperture.

Figure 4:
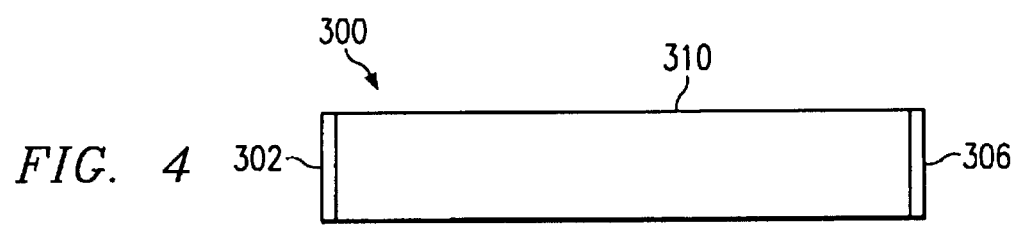
FIG. 4 is a side view of the integrating rod of FIG. 3 showing the deposition of the mirrored apertures on the entrance and exit faces of the integrating rod.
Figure 5:
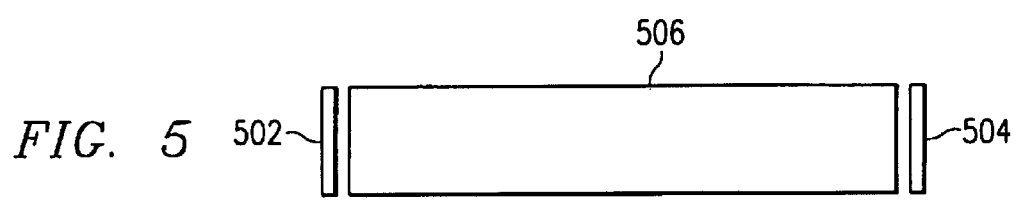
FIG. 5 is a side view of an integrating rod similar to the one shown in FIG. 4, but using separate mirrors positioned near the entrance and exit face of the integrating rod.

FIG. 4 is a side view of the integrator rod 300 of FIG. 3 showing the mirror 302 deposited on the entrance face and the mirror 306 deposited on the exit face of the integrating rod body 310. FIG. 5 is a side view of an alternate embodiment of an integrating rod. In FIG. 5, no mirrors have been deposited on the integrator rod body 506, but instead separate mirrors 502, 504 are placed just outside the entrance and exit faces of the integrator rod 506. Using a separate mirror for either the input aperture or the output aperture, or both, may be less expensive overall than depositing a mirror on the surface of the integrator rod body. Regardless of whether the mirrored entrance aperture is deposited on the entrance face of the integrator body or provided as a separate mirror, if a mirrored entrance aperture is capable of reflecting light from either side, that is light coming toward the integrating rod from the light source as well as light returning through the integrating rod, the light striking the entrance face outside on the mirrored surface will be returned to the light source and may be reflected by the light source through the entrance aperture on the entrance face.

Figure 6:
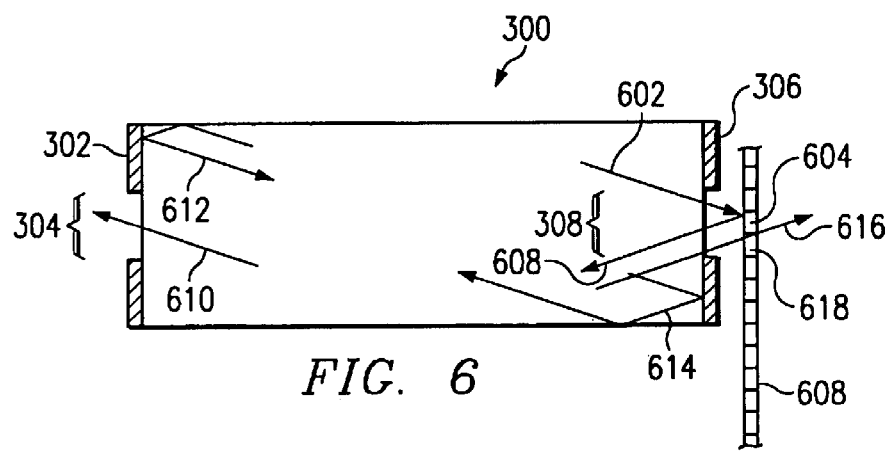
FIG. 6 is a cross sectional side view of the integrating rod of FIG. 3 showing the light recycling process within the integrating rod.

FIG. 6 shows the light recycling process occurring within the integrating rod of FIG. 3. In FIG. 6, light ray 602 exits the integrating rod 300 by passing through the aperture 308 in the exit face mirror 306. If filter segment 604 of the color wheel 606 rejects the light 602, it is reflected along path 608 back to the entrance end of the integrating rod 300. When the exit face of the integrating rod is mirrored, some of the light misses the aperture 308 and returns to the entrance face without ever reaching the color wheel 606.

When the reflected light reaches the input end of the integrating rod 300, it may follow path 610 and pass through the input aperture 304 of the integrating rod 300, or it follow light path 612 and be reflected by the mirrored entrance end of the integrating rod 300. Light passing through the input aperture 304 of the integrating rod 300 returns to the reflector or light source. Ideally, the light returning to the reflector and light source is reflected back to the input aperture 304 of the integrating rod 300.

After being reflected by the mirrored entrance face of the integrating rod or returning from the reflector or light source, the recycled light travels to the exit face of the integrating rod 300 a second time. Ideally, the recycled light 616 follows a path through the exit aperture 308 that impinges a different color filter 618 allowing the recycled light to pass through the color wheel 606 and continue on to the light valve. Light that strikes the mirror on the exit face 306, and light that is rejected by the dynamic filter a second time travels back through the integrator rod 300 again until it either escapes, is absorbed, or passes through the dynamic filter.

Figure 8:
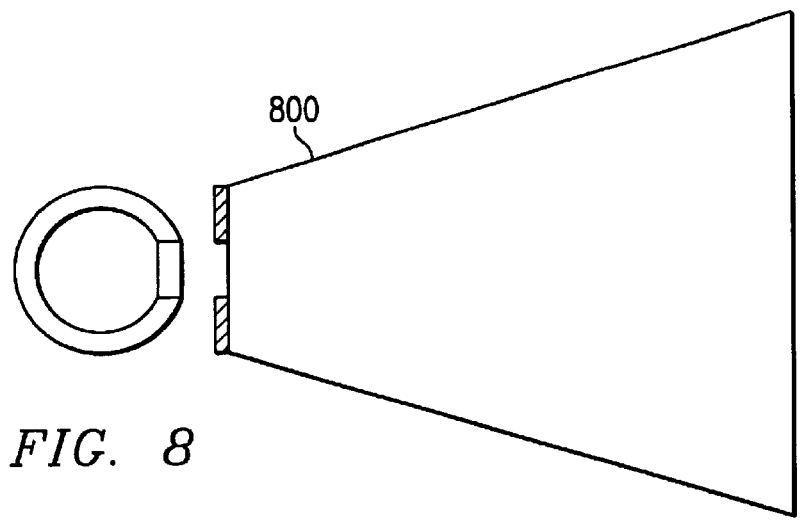
FIG. 8 is a side view of a tapered integrating rod suitable for use with light sources having a very small output aperture and a large exit cone.
Figure 9:
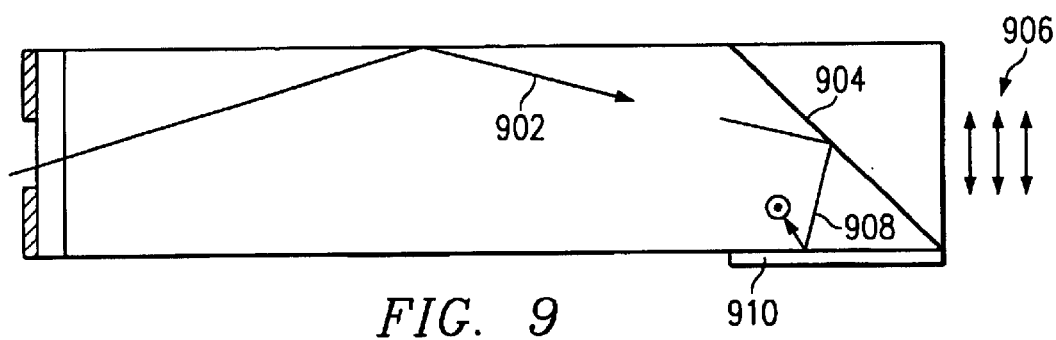
FIG. 9 is a side view of a recycling integrator rod designed to receive unpolarized light and emit polarized light.
Figure 10:
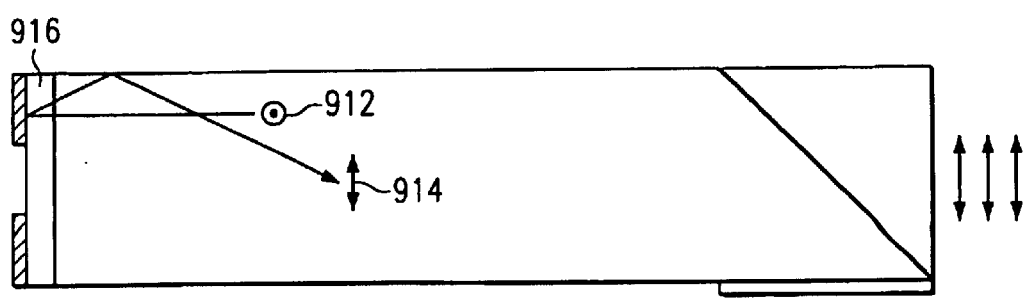
FIG. 10 is a side view of the recycling integrator rod of FIG. 9 showing the process of polarization recycling occurring within the integrating rod.

FIG. 8 is a side view of a tapered integrating rod 800 having mirrored entrance and exit apertures similar to the integrating rod of FIG. 3. The integrating rod shown in FIG. 8 is ideally suited to use with light sources having a small exit aperture and a large exit cone with a near-Lambertian output. For example, some RF-pumped light sources have a small rectangular output window and a half-angle cone of light exiting the window as large as 60°. The tapered integrating rod 800 shown in FIG. 8 reflects the high-angle exit light at a shallower angle The recycling principles taught herein are also applicable to display systems that rely on polarized light. An example of a polarized light recycling integrator rod is shown in FIGS. 9 and 10. FIG. 9 shows a ray of light 902 entering the entrance aperture of, and traveling through the polarizing integrator rod. A broadband polarizing coating 904, similar to the coatings used by cube beam splitters, is orientated within the integrating rod at a 45° angle. When the light reaches the polarizing coating 904, one polarization—the p-polarization 906—passes through the coating 904 and exits the end of the integrating rod. The remaining orthogonally polarized light—the s-polarization 908—is reflected by the coating 904 and a mirror 910. The light is reflected by the mirror 910 and a second time by the coating 904 before traveling back through the integrating rod.

As the s-polarized light 912 travels through the integrating rod, it passes through a quarter-wave plate 916 with a fast axis at 45°, shown in FIG. 10. After passing through the quarter-wave plate 916 the light reflects from the mirror on the entrance face and passes through the quarter-wave plate a second time. After two passes, the s-polarized light 912 becomes p-polarized light 914. The p-polarized light traverses the integrating rod a third time and passes through the polarizing coating 904 and on to the light valve. Although shown at opposite ends of the integrating rod, the polarizing coating 904 and quarter-wave plate 916 need not be located near the ends of the integrating rod.

The size and shape of the entrance aperture largely is determined by the light source being used. Likewise, the size and shape of the exit aperture is determined by the light valve being used. The aspect ratio of the integrating rod typically matches the aspect ratio of the light valve, especially when the integrating rod does not have a mirrored exit aperture. While many textbooks and other sources provide equations used to determine an optimal rod length. These equations rarely take into account the aspect ratio of the rods, and do not address the mirrored aperture 304 discussed herein. Due to the large number of variables involved, including the output characteristics of the light source and reflector, these equations generally only provide a rough starting measurement for non-sequential ray trace simulations that are used to determine the optimum integrating rod specifications.

Thus, although there has been disclosed to this point a particular embodiment for a rod integrator especially adapted for use with sequential color recapture display systems, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. An integrating rod comprised of:

an elongated body, said elongated body operable to reflect light traveling through said elongated body;

an entrance face on a first end of said elongated body; and a mirrored entrance aperture at said entrance face, said mirrored entrance aperture having a transmissive entrance aperture portion and a mirrored portion, said mirrored entrance aperture allowing light to pass through the aperture thereof to enter the elongated body of said integrating rod, said mirrored entrance aperture operable to reflect light traveling through said elongated body to said entrance face that strikes said mirrored entrance aperture outside said transmissive entrance aperture portion.

2. The integrating rod of claim 1, wherein said entrance aperture is circular.

3. The integrating rod of claim 1, wherein said entrance aperture is elliptical.

4. The integrating rod of claim 1, wherein said entrance aperture is rectangular.

5. The integrating rod of claim 1, wherein said entrance aperture is centered on said entrance face and surrounded by said mirrored portion of said mirrored entrance aperture.

6. The integrating rod of claim 1, wherein said mirrored entrance aperture is on said entrance face.

7. The integrating rod of claim 1, wherein said mirrored entrance aperture is a metal layer deposited on said entrance face.

8. The integrating rod of claim 1, wherein said mirrored entrance aperture is a mirror positioned next to said entrance face.

9. The integrating rod of claim 1, said elongated body having a circular cross section.

10. The integrating rod of claim 1, said elongated body having a rectangular cross section.

11. The integrating rod of claim 1, said elongated body having a triangular cross section.

12. The integrating rod of claim 1, said elongated body having a hexagonal cross section.

13. The integrating rod of claim 1, said elongated body having a square cross section.

14. The integrating rod of claim 1, wherein said elongated body is tapered.

15. The integrating rod of claim 1, wherein said elongated body is hollow.

16. The integrating rod of claim 1, wherein said elongated body is a solid transparent body.

17. The integrating rod of claim 1, wherein said elongated body is glass.

18. The integrating rod of claim 1, wherein said light traveling through said elongated body is reflected by mirrored surfaces along said elongated body.

19. The integrating rod of claim 1, wherein said light traveling through said elongated body is reflected by total internal reflection at an interface between said elongated body and a media surrounding said elongated body.

20. The integrating rod of claim 19, wherein said media surrounding said elongated body is air.

21. The integrating rod of claim 1, further comprising a mirrored exit aperture at an exit face of said elongated body, said mirrored exit aperture having a transmissive exit aperture portion and a mirrored exit portion, said mirrored exit aperture allowing light to pass through the aperture thereof after leaving said elongated body of said integrating rod, said mirrored exit aperture operable to reflect light traveling through said elongated body to said exit face that strikes said mirrored exit aperture outside said transmissive exit aperture.

22. The integrating rod of claim 21, wherein said exit face is opposite said entrance face.

23. The integrating rod of claim 21, wherein said exit aperture is circular.

24. The integrating rod of claim 21, wherein said exit aperture is elliptical.

25. The integrating rod of claim 21, wherein said exit aperture is rectangular.

26. The integrating rod of claim 21, wherein said exit aperture is centered on said exit face and surrounded by said mirrored portion of said mirrored exit aperture.

27. The integrating rod of claim 21, wherein said mirrored exit aperture is on said exit face.

28. The integrating rod of claim 21, wherein said mirrored exit aperture is a metal layer deposited on said exit face.

29. The integrating rod of claim 21, wherein said mirrored exit aperture is a mirror positioned next to said exit face.

30. A polarizing integrating rod comprised of:

an elongated body, said elongated body operable to reflect light traveling through said elongated body;

an entrance face on a first end of said elongated body;

a mirrored entrance aperture at said entrance face, said mirrored entrance aperture having a transmissive entrance aperture portion and a mirrored portion, said mirrored entrance aperture allowing light to pass through the aperture thereof to enter the elongated body of said integrating rod, said mirrored entrance aperture operable to reflect light traveling through said elongated body to said entrance face that strikes said mirrored entrance aperture outside said transmissive entrance aperture;

a polarizing coating, said polarizing coating transmitting light of a first polarization and reflection light of a second polarization;

a quarter wave plate for receiving light of said second polarization reflected by said polarizing coating and converting said light of a second polarization to said first polarization.

* * * * *